United States Patent
Lu

(10) Patent No.: US 10,616,503 B2
(45) Date of Patent: Apr. 7, 2020

(54) COMMUNICATION APPARATUS AND OPTICAL DEVICE THEREOF

(71) Applicant: Primax Electronics Ltd., Taipei (TW)

(72) Inventor: Chun-I Lu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 266 days.

(21) Appl. No.: 15/785,999

(22) Filed: Oct. 17, 2017

(65) Prior Publication Data

US 2018/0324364 A1 Nov. 8, 2018

(30) Foreign Application Priority Data

May 5, 2017 (TW) .............................. 106115018 A

(51) Int. Cl.
| | |
|---|---|
| *H04N 5/262* | (2006.01) |
| *H04N 5/225* | (2006.01) |
| *H04N 5/232* | (2006.01) |
| *G06F 1/16* | (2006.01) |
| *H04M 1/02* | (2006.01) |

(52) U.S. Cl.
CPC ......... *H04N 5/2621* (2013.01); *G06F 1/1605* (2013.01); *G06F 1/1613* (2013.01); *G06F 1/1626* (2013.01); *G06F 1/1686* (2013.01); *H04M 1/0202* (2013.01); *H04M 1/0264* (2013.01); *H04N 5/2251* (2013.01); *H04N 5/2258* (2013.01); *H04N 5/23229* (2013.01); *H04N 5/23238* (2013.01); *H04N 5/23245* (2013.01); *H04M 2250/52* (2013.01)

(58) Field of Classification Search
CPC combination set(s) only.
See application file for complete search history.

(56) References Cited

U.S. PATENT DOCUMENTS

| | | | |
|---|---|---|---|
| 9,521,321 B1* | 12/2016 | Kozko | H04N 5/23238 |
| 9,854,164 B1* | 12/2017 | Kozko | H04N 5/23238 |
| 10,186,301 B1* | 1/2019 | van Hoff | G11B 27/34 |
| 2003/0036365 A1* | 2/2003 | Kuroda | H04M 1/0214 |
| | | | 455/575.1 |
| 2006/0187338 A1* | 8/2006 | May | H04N 5/2254 |
| | | | 348/375 |
| 2013/0050394 A1* | 2/2013 | Zhou | H04N 5/23238 |
| | | | 348/14.02 |
| 2014/0192214 A1* | 7/2014 | Laroia | G06T 11/60 |
| | | | 348/218.1 |

(Continued)

*Primary Examiner* — Yuwen Pan
*Assistant Examiner* — Erica L Fleming-Hall
(74) *Attorney, Agent, or Firm* — Muncy, Geissler, Olds & Lowe, P.C.

(57) ABSTRACT

A communication apparatus includes a housing, an optical device and an image processing module. A first optical module of the optical device captures a first image corresponding to a first side of the housing. A second optical module captures a second image corresponding to a second side of the housing. A third optical module captures a third image corresponding to the second side of the housing. The image processing module is electrically connected with the optical device. The image processing module produces a 360-degree panoramic image according to the first image and the second image. Moreover, the image processing module obtains depth-of-field information of the second image or the third image according to the second image and the third image.

12 Claims, 3 Drawing Sheets

(56) References Cited

U.S. PATENT DOCUMENTS

| | | | |
|---|---|---|---|
| 2014/0300692 A1* | 10/2014 | Lablans | G03B 37/00 348/38 |
| 2015/0054913 A1* | 2/2015 | Annau | G11B 27/11 348/36 |
| 2015/0077580 A1* | 3/2015 | Kim | H04N 5/2258 348/211.1 |
| 2015/0116547 A1* | 4/2015 | Laroia | G02B 13/009 348/240.1 |
| 2015/0138423 A1* | 5/2015 | Laroia | G02B 13/0065 348/340 |
| 2015/0212702 A1* | 7/2015 | Kim | G06F 3/04842 715/838 |
| 2015/0341541 A1* | 11/2015 | Naik | H04N 5/23206 348/207.11 |
| 2016/0050394 A1* | 2/2016 | Segal | H04N 7/15 348/14.08 |
| 2016/0104285 A1* | 4/2016 | Pettegrew | G06T 7/80 348/36 |
| 2016/0165211 A1* | 6/2016 | Balasubramanian | H04N 13/296 348/38 |
| 2016/0316249 A1* | 10/2016 | Smith | H04N 5/23238 |
| 2016/0381286 A1* | 12/2016 | Chen | H04N 5/23216 348/36 |
| 2017/0026574 A1* | 1/2017 | Kwon | H04N 5/23238 |
| 2017/0041536 A1* | 2/2017 | Chern | H04N 5/23238 |
| 2017/0052566 A1* | 2/2017 | Ka | G06F 3/0483 |
| 2017/0111578 A1* | 4/2017 | Eromaki | H04N 5/2258 |
| 2017/0150130 A1* | 5/2017 | Kimura | H04N 13/271 |
| 2018/0017436 A1* | 1/2018 | Chern | G01J 1/0411 |
| 2018/0270414 A1* | 9/2018 | Pai | H04N 5/23238 |
| 2018/0324364 A1* | 11/2018 | Lu | H04N 5/2621 |

* cited by examiner

COMMUNICATION APPARATUS AND OPTICAL DEVICE THEREOF

FIELD OF THE INVENTION

The present invention relates to a communication apparatus, and more particularly to a communication apparatus capable of capturing images.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various image pickup devices are widely used in many kinds of fields such as smart phones, wearable electronic devices, aerial imaging devices or any other appropriate electronic devices. Since the image pickup devices are small and portable, the users can take the image pickup devices to capture images and store the images according to the users' requirements at any time. Moreover, the images can be uploaded to the internet through mobile networks. In other words, these electronic devices not only have important commercial values but also provide more colorful lives to people.

With the improvement of the living quality, people's demands on the images are gradually increased. Consequently, the image pickup device provides more functions. For example, the existing smart phone is usually equipped with a front lens module and a rear lens module. Generally, the front lens module is used for taking a self-portrait photo. Moreover, the rear lens module has a higher specification than the front lens module. Consequently, the rear lens module is used for shooting the images in various scenes. While the user holds the smart phone and rotates the smart phone along a horizontal direction, the rear lens module may continuously shoot the scene and capture plural local images. After plural local images are captured, an image processing program of the smart phone is executed to perform computation on these local images and combine these local images as a 360-degree panoramic image. However, since it is difficult to rotate the mobile phone along the horizontal direction at the constant speed, the width of the 360-degree panoramic image is usually not uniformly distributed.

Moreover, the user hopes that the quality of the image captured by the image pickup device of the smart phone is comparable to image quality of the single-lens reflex camera. Consequently, the manufacturer of the mobile phone continuously improves the specification of the rear lens module. For example, as the f-number of the rear lens module is increased, the focused position of the captured image is sharper but the non-focused positions are blurred. As the specification of the rear lens module is increased, the overall fabricating cost of the smart phone is increased. The increased fabricating cost reduces the competitiveness of the smart phone.

In other words, the communication apparatus with the image pickup device needs to be further improved.

SUMMARY OF THE INVENTION

An object of the present invention provides a communication apparatus comprising an optical device with three optical modules. Although the cost of fabricating the optical device is low, the communication apparatus of the present invention can provide various image functions to meet the users' requirements.

In accordance with an aspect of the present invention, there is provided a communication apparatus for performing mobile communication. The communication apparatus includes a housing, a first optical module, a second optical module, a third optical module and an image processing module. The housing has a first surface and a second surface. The first surface and the second surface are opposed to each other. The first optical module is partially exposed to the first surface of the housing. Moreover, the first optical module is used for captures a first image corresponding to the first surface of the housing. The second optical module is partially exposed to the second surface of the housing. Moreover, the second optical module is used for capturing a second image corresponding to the second surface of the housing. The third optical module is partially exposed to the second surface of the housing. Moreover, the third optical module is used for capturing a third image corresponding to the second surface of the housing. The image processing module is disposed within the housing and electrically connected with the first optical module, the second optical module and the third optical module. The image processing module produces a 360-degree panoramic image according to the first image and the second image. Moreover, the image processing module obtains depth-of-field information of the second image or the third image according to the second image and the third image.

In accordance with another aspect of the present invention, there is provided, there is provides an optical device for a communication apparatus. The communication apparatus includes an image processing module, and has a first surface and a second surface. The first surface and the second surface are opposed to each other. The optical device includes a first optical module, a second optical module and a third optical module. The first optical module is partially exposed to the first surface of the housing. Moreover, the first optical module is used for capturing a first image corresponding to the first surface of the housing. The second optical module is partially exposed to the second surface of the housing. Moreover, the second optical module is used for capturing a second image corresponding to the second surface of the housing. The third optical module is partially exposed to the second surface of the housing. Moreover, the third optical module is used for capturing a third image corresponding to the second surface of the housing. The image processing module produces a 360-degree panoramic image according to the first image and the second image. Moreover, the image processing module obtains depth-of-field information of the second image or the third image according to the second image and the third image.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
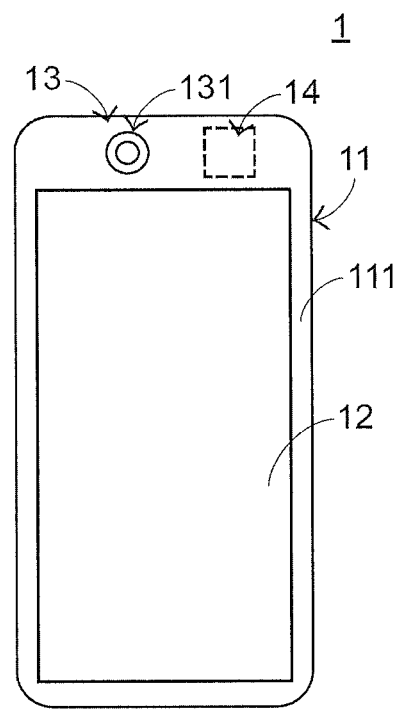
FIG. 1 is a schematic front view illustrating a communication apparatus according to an embodiment of the present invention.
Figure 2:
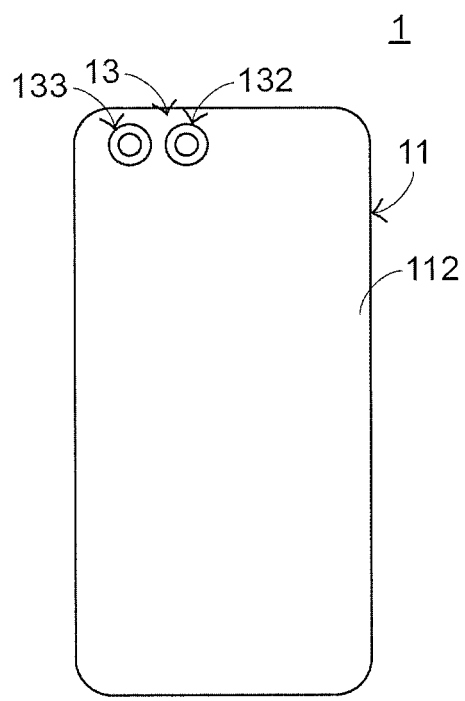
FIG. 2 is a schematic rear view illustrating the communication apparatus of FIG. 1.

FIG. 1 is a schematic front view illustrating a communication apparatus according to an embodiment of the present invention. FIG. 2 is a schematic rear view illustrating the communication apparatus of FIG. 1. The communication apparatus 1 is used for implementing communication such as telecommunication or network communication. For example, the communication apparatus 1 is a smart phone, a tablet computer or any other appropriate mobile device. In this embodiment, the communication apparatus 1 comprises a housing 11, a touch screen 12, an optical device 13 and a processor 14. The housing 11 has a front surface 111 (also referred as a first surface) and a rear surface 112 (also referred as a second surface). The processor 14 is disposed within the housing 11. The touch screen 12 is electrically connected with the processor 14 and exposed to the second surface 112 of the housing 11. Consequently, the user may operate the communication apparatus 1 through touch control.

Figure 4:
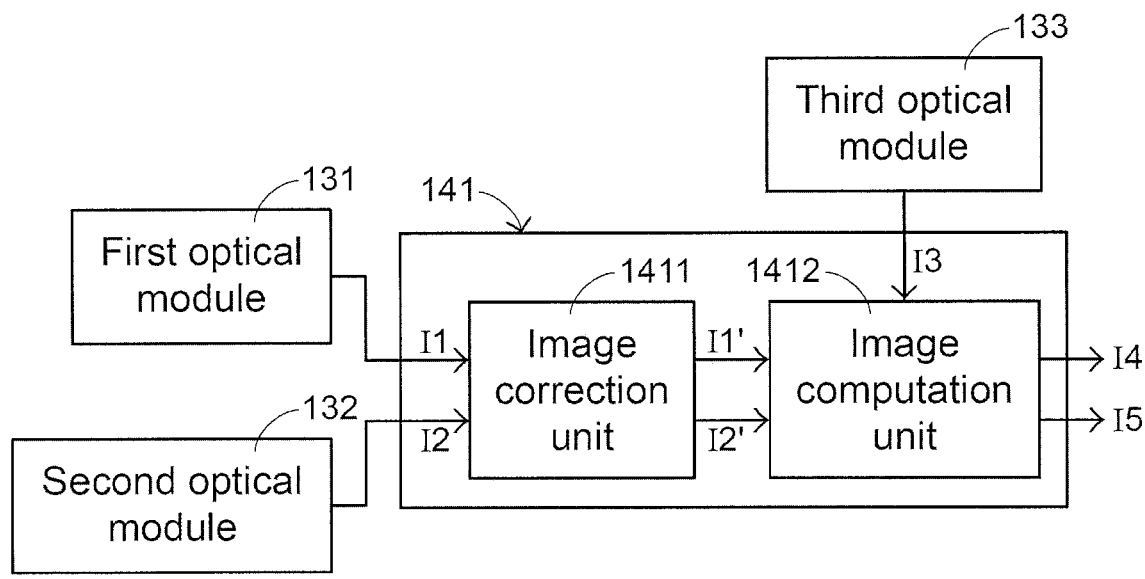
FIG. 4 is a schematic block diagram illustrating the relationship between the optical device and the processor of the communication apparatus according to an embodiment of the present invention.

The optical device 13 comprises a first optical module 131, a second optical module 132 and a third optical module 133. The first optical module 131 is partially exposed to the first surface 111 of the housing 11. Moreover, the first optical module 131 is used for capturing a rear image corresponding to the first surface 111 of the housing 11 (i.e., a first image I1 as shown in FIG. 4). The second optical module 132 and the third optical module 133 are arranged side by side, and partially exposed to the second surface 112 of the housing 11. Moreover, the second optical module 132 and the third optical module 133 are used for acquiring the front images corresponding to the second surface 112 of the housing 11 (i.e., a second image I2 and a third image I3 as shown in FIG. 4).

Figure 3:
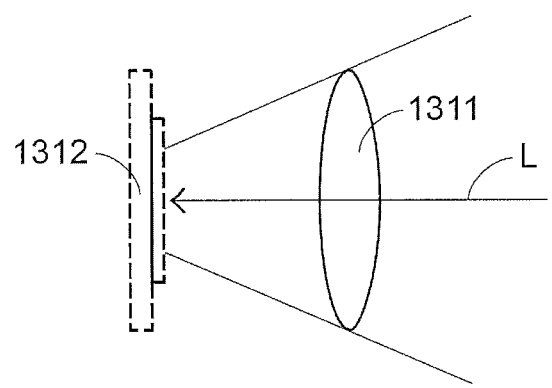
FIG. 3 is schematic side view illustrating the first optical module of the communication apparatus of FIG. 1.

FIG. 3 is schematic side view illustrating the first optical module of the communication apparatus of FIG. 1. In this embodiment, the first optical module 131 comprises a lens module 1311 and an optical sensor 1312. The lens module 1311 is partially exposed outside the first surface 111 of the housing 11 (see FIG. 1). The optical sensor 1312 is disposed within the housing 11. After an ambient light beam L passing through the lens module 1311 is projected onto the optical sensor 1312, the ambient light beam L is sensed by the optical sensor 1312. Consequently, the first image I1 is acquired.

The structures of the second optical module 132 and the third optical module 133 are similar to the structure of the first optical module 131, and are not redundantly described herein. However, for complying with different specification requirements, the lens constituents of the lens modules of the first optical module 131, the second optical module 132 and the third optical module 133 are distinguished. In an embodiment, the field of view (FOV) of the first optical module 131 is in the range between 187 and 190 degrees, the FOV of the second optical module 132 is in the range between 187 and 190 degrees, and the FOV of the third optical module 133 is in the range of the 75 and 90 degrees. The constituent and FOV of each optical module are presented herein for purpose of illustration and description only. That is, the constituent and FOV of each optical module may be varied according to the practical requirements.

FIG. 4 is a schematic block diagram illustrating the relationship between the optical device and the processor of the communication apparatus according to an embodiment of the present invention. In this embodiment, the processor 14 comprises an image processing module 141. The image processing module 141 comprises an image correction unit 1411 and an image computation unit 1412. Moreover, the image processing module 141 is electrically connected with the first optical module 131, the second optical module 132 and the third optical module 133. The first image I1, the second image I2 and the third image I3 captured by the first optical module 131, the second optical module 132 and the third optical module 133 are further processed by the image processing module 141.

As mentioned above, the FOV of the first optical module 131 and the FOV of the second optical module 132 are ultra-wide FOVs. Consequently, the periphery image of the first image I1 and the periphery image of the second image I2 captured by the first optical module 131 and the second optical module 132 are possible suffered from image distortion. After the first image I1 is corrected by the image correction unit 1411 of the image processing module 141, a first corrected image IF (i.e., the corrected rear image) is generated. After the second image I2 is corrected by the image correction unit 1411 of the image processing module 141, a second corrected image I2' (i.e., the corrected front image) is generated. The image computation unit 1412 is electrically connected with the image correction unit 1411. After the first corrected image I1' and the second corrected image I2' from the image correction unit 1411 are received by the image computation unit 1412, the first corrected image IF and the second corrected image I2' are combined as a 360-degree panoramic image I4.

As mentioned above, the second optical module 132 and the third optical module 133 are arranged side by side, and partially exposed to the second surface 112 of the housing 11. Consequently, the second image I2 captured by the second optical module 132 and the third image I3 captured by the third optical module 133 are front images from different viewing angles. In an embodiment, the image computation unit 1412 further calculates depth-of-field information I5 of the front images according to the difference between the second corrected image I2' and the third image I3. The technologies of correcting the image distortion, the technologies of combining the first corrected image I1' and the second corrected image I2' as the 360-degree panoramic image I4 and the technologies of calculating depth-of-field information I5 of the front images from different viewing angles are well known to those skilled in the art, and are not redundantly described herein.

Figure 5:
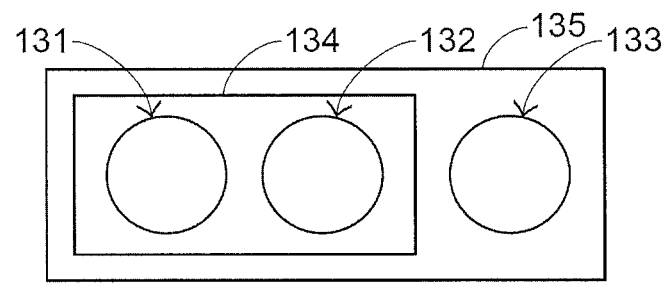
FIG. 5 is a schematic assembled view illustrating the optical device of the communication apparatus according to the embodiment of the present invention.
Figure 6:
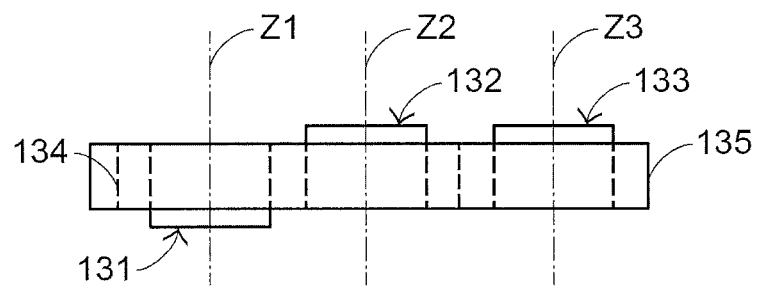
FIG. 6 is a schematic assembled view illustrating the optical device of FIG. 5 and taken along another viewpoint.

FIG. 5 is a schematic assembled view illustrating the optical device of the communication apparatus according to the embodiment of the present invention. FIG. 6 is a schematic assembled view illustrating the optical device of FIG. 5 and taken along another viewpoint. As shown in FIGS. 5 and 6, the optical device 13 further comprises a first frame 134 and a second frame 135. The first frame 134 is used for fixing the first optical module 131 and the second optical module 132. Consequently, an optical axis Z1 of the first optical module 131 and an optical axis Z2 of the second optical module 132 are in parallel with each other. The second frame 135 is used for fixing the first frame 134 and the third optical module 133. Consequently, an optical axis Z3 of the third optical module 133 is in parallel with the optical axis Z2 of the second optical module 132. After the first optical module 131 and the second optical module 132 are fixed on the first frame 134 and the third optical module 133 is fixed on the second frame 135, the second frame 135 is installed between the first surface 111 and the second surface 112 of the housing 11 of the communication apparatus 1. Consequently, the optical device 13 is assembled.

Since the optical device 13 of the communication apparatus 1 comprises three optical modules 131, 132 and 133, the communication apparatus 1 may have at least three shooting modes. The operations of these shooting modes will be described as follows.

In accordance with a first shooting mode, the first image I1 (i.e., the rear image) is shot through the first optical module 131 at the first surface 111 (i.e., the front surface) of the housing 11. As mentioned above, the first optical module 131 has the ultra-wide FOV, and the image processing module 141 of the communication apparatus 1 is capable of correcting the image distortion. Consequently, when the first optical module 131 is used for capturing the self-portrait photo within a short distance, the shooting efficacy is satisfactory.

In accordance with a second shooting mode, the second image I2 (i.e., the front image) is shot by the second optical module 132 at the second surface 112 (i.e., the rear surface) of the housing 11. As mentioned above, the second optical module 132 has the ultra-wide FOV, and the image processing module 141 of the communication apparatus 1 is capable of correcting the image distortion. Consequently, when the second optical module 132 is used for shooting the scene, the wide-angle front image is acquired. Moreover, the third optical module 133 beside the second optical module 132 is used for capturing the front image from a different viewing angle. According to the front images captured by the second optical module 132 and the third optical module 133, the depth-of-field information of the front image is obtained for various applications. For example, the depth-of-field information may be applied to the depth blur of the image. Consequently, the shooting effect of the image is similar to the shooting effect obtained by the large aperture lens module.

In accordance with a third shooting mode, the first image I1 (i.e., the rear image) is shot through the first optical module 131 at the first surface 111 (i.e., the front surface) of the housing 11, and the second image I2 (i.e., the front image) is shot by the second optical module 132 at the second surface 112 (i.e., the rear surface) of the housing 11. The first image I1 and the second image I2 are combined as the 360-degree panoramic image I4. For obtaining the panoramic image, it is not necessary to rotate the communication apparatus along the horizontal direction. Consequently, the width of the panoramic image I4 is uniformly distributed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A communication apparatus for performing mobile communication, the communication apparatus comprising:

a housing having a first surface and a second surface, wherein the first surface and the second surface are opposed to each other;

a first optical module partially exposed to the first surface of the housing, and capturing a first image corresponding to the first surface of the housing;

a second optical module partially exposed to the second surface of the housing, and capturing a second image corresponding to the second surface of the housing;

a third optical module partially exposed to the second surface of the housing, and capturing a third image corresponding to the second surface of the housing;

an image processing module disposed within the housing and electrically connected with the first optical module, the second optical module and the third optical module, wherein the image processing module produces a 360-degree panoramic image according to the first image and the second image, and the image processing module obtains depth-of-field information of the second image or the third image according to the second image and the third image;

a first frame, wherein the first optical module and the second optical module are fixed on the first frame, so that an optical axis of the first optical module and an optical axis of the second optical module are in parallel with each other; and a second frame, wherein the first frame and the third optical module are fixed on the second frame, so that an optical axis of the third optical module is in parallel with the optical axis of the second optical module;

wherein after the first frame and the third optical module are fixed on the second frame, the second frame is assembled with the housing.

2. The communication apparatus according to claim 1, wherein the image processing module comprises an image correction unit, wherein after the second image is corrected by the image correction unit, a second corrected image is generated.

3. The communication apparatus according to claim 2, wherein the image processing module further comprises an image computation unit, and the image computation unit is electrically connected with the image correction unit, wherein after the first image is corrected by the image correction unit, a first corrected image is generated, wherein after the first corrected image and the second corrected image are received by the image computation unit, the first corrected image and the second corrected image are combined as the 360-degree panoramic image.

4. The communication apparatus according to claim 2, wherein the image processing module obtains the depth-of-field information according to the second corrected image and the third image.

5. The communication apparatus according to claim 1, wherein a field of view of the first optical module and a field of view of the second optical module are larger than a field of view of the third optical module.

6. The communication apparatus according to claim 1, wherein the field of view of the first optical module and/or the field of view of the second optical module is larger than 180 degrees.

7. The communication apparatus according to claim 1, wherein each of the first optical module, the second optical module and the third optical module comprises a lens module and an optical sensor, wherein the lens module is partially exposed outside the housing, and an ambient light beam is projected on the optical sensor through the lens module.

8. The communication apparatus according to claim 1, wherein the communication apparatus is a smart phone or a tablet computer.

9. An optical device for a communication apparatus, the communication apparatus comprising an image processing module and having a first surface and a second surface, the first surface and the second surface being opposed to each other, the optical device comprising:
   a first optical module partially exposed to the first surface of the housing, and capturing a first image corresponding to the first surface of the housing;
   a second optical module partially exposed to the second surface of the housing, and capturing a second image corresponding to the second surface of the housing;
   a third optical module partially exposed to the second surface of the housing, and capturing a third image corresponding to the second surface of the housing, wherein the image processing module produces a 360-degree panoramic image according to the first image and the second image, and the image processing module obtains depth-of-field information of the second image or the third image according to the second image and the third image;
   a first frame, wherein the first optical module and the second optical module are fixed on the first frame, so that an optical axis of the first optical module and an optical axis of the second optical module are in parallel with each other; and
   a second frame, wherein the first frame and the third optical module are fixed on the second frame, so that an optical axis of the third optical module is in parallel with the optical axis of the second optical module;
   wherein after the first frame and the third optical module are fixed on the second frame, the second frame is assembled with the housing.

10. The optical device according to claim 9, wherein a field of view of the first optical module and a field of view of the second optical module are larger than a field of view of the third optical module.

11. The optical device according to claim 9, wherein the field of view of the first optical module and/or the field of view of the second optical module is larger than 180 degrees.

12. The optical device according to claim 9, wherein each of the first optical module, the second optical module and the third optical module comprises a lens module and an optical sensor, wherein the lens module is partially exposed outside the housing, and an ambient light beam is projected on the optical sensor through the lens module.

\* \* \* \* \*